(12) United States Patent
Bali et al.

(10) Patent No.: US 10,423,332 B2
(45) Date of Patent: Sep. 24, 2019

(54) FIBRE CHANNEL STORAGE ARRAY HAVING STANDBY CONTROLLER WITH ALUA STANDBY MODE FOR FORWARDING SCSI COMMANDS

(71) Applicant: HEWLETT PACKARD ENTERPRISE DEVELOPMENT LP, Houston, TX (US)

(72) Inventors: Naveen Bali, Durham, NC (US); Tao Jin, Durham, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 917 days.

(21) Appl. No.: 14/853,626

(22) Filed: Sep. 14, 2015

(65) Prior Publication Data
US 2016/0077996 A1 Mar. 17, 2016

Related U.S. Application Data

(60) Provisional application No. 62/050,680, filed on Sep. 15, 2014.

(51) Int. Cl.
*G06F 3/06* (2006.01)
*G06F 13/42* (2006.01)
(Continued)

(52) U.S. Cl.
CPC .............. *G06F 3/061* (2013.01); *G06F 3/067* (2013.01); *G06F 3/0611* (2013.01); *G06F 3/0617* (2013.01); *G06F 3/0619* (2013.01); *G06F 3/0631* (2013.01); *G06F 3/0635* (2013.01); *G06F 3/0659* (2013.01);
(Continued)

(58) Field of Classification Search
None
See application file for complete search history.

(56) References Cited

U.S. PATENT DOCUMENTS 6,594,709 B1 7/2003 Agasaveeran et al.
7,467,191 B1 12/2008 Wang et al. ................. 709/221
(Continued)

OTHER PUBLICATIONS

PCT/US2015/047535, Nov. 27, 2015, Form PCT/ISA/210, International Search Report.
(Continued)

*Primary Examiner* — Scott C Sun

(57) ABSTRACT

Storage arrays, systems and methods for processing commands to enable SCSI-level forwarding between an active controller and a standby controller are provided. In one example, the standby controller has ports that operate in an asymmetric logical unit access (ALUA) standby (SB) mode. One such method includes receiving a command by a port of the standby controller, wherein the port operates in the ALUA SB mode. The method includes identifying that the command is of a type that is predefined for forwarding, and forwarding the command from a SCSI layer of the standby controller to a SCSI layer of the active controller. The method further includes processing the command in a user space of the active controller to generate return data and forwarding the return data from the active controller to the standby controller. The method additionally includes sending the return data to the initiator, over the port of the standby controller.

19 Claims, 9 Drawing Sheets

(51) Int. Cl.
*G06F 13/40* (2006.01)
*G06F 11/00* (2006.01)
*G06F 11/20* (2006.01)
*G06F 13/38* (2006.01)

(52) U.S. Cl.
CPC .......... *G06F 3/0665* (2013.01); *G06F 3/0685* (2013.01); *G06F 3/0689* (2013.01); *G06F 11/00* (2013.01); *G06F 11/20* (2013.01); *G06F 13/4027* (2013.01); *G06F 13/426* (2013.01); *G06F 13/4282* (2013.01)

(56) References Cited

U.S. PATENT DOCUMENTS

| | | | |
|---|---|---|---|
| 8,626,967 B1 | 1/2014 | Naik et al. | |
| 2003/0004952 A1 | 1/2003 | Nixon et al. | |
| 2003/0126225 A1 | 7/2003 | Camble et al. | |
| 2003/0131182 A1 | 7/2003 | Kumar et al. | |
| 2005/0033916 A1 | 2/2005 | Dellacona | 711/114 |
| 2005/0055606 A1 | 3/2005 | Kutan et al. | |
| 2005/0259632 A1 | 11/2005 | Malpani et al. | 370/351 |
| 2008/0133942 A1 | 6/2008 | Ogasawara et al. | 713/300 |
| 2011/0116362 A1 | 5/2011 | Singatwaria et al. | |
| 2013/0066837 A1 | 3/2013 | Colrain et al. | 707/674 |
| 2014/0244936 A1 | 8/2014 | Maharana et al. | |
| 2015/0262632 A1* | 9/2015 | Shelton | G06F 12/0684 711/103 |
| 2015/0301964 A1* | 10/2015 | Brinicombe | G06F 13/28 710/308 |

OTHER PUBLICATIONS

International Searching Authority, "Written Opinion of the International Searching Authority," issued in International Application No. PCT/US2015/047535, dated Nov. 27, 2015, 9 pages.
The International Bureau of WIPO, "International Preliminary Report on Patentability," issued in International Application No. PCT/US2015/047535, dated Mar. 21, 2017, 10 pages.
United States Patent and Trademark Office, Non-final Office Action, issued in U.S. Appl. No. 14/846,689, dated May 23, 2017, 30 pages.
Penokie, "SAM-4: Converting to UML part 1", May 22, 2006, T10/06-116 revision 2, to T10 Committee (SCSI), 52 pages.

* cited by examiner

FIBRE CHANNEL STORAGE ARRAY HAVING STANDBY CONTROLLER WITH ALUA STANDBY MODE FOR FORWARDING SCSI COMMANDS

CLAIM OF PRIORITY

This application claims priority from U.S. Provisional Patent Application No. 62/050,680, filed on Sep. 15, 2014, entitled "Fibre Channel Storage Array Systems and Methods," which is herein incorporated by reference.

BACKGROUND

1. Field of the Invention

The present embodiments relate to storage arrays, methods, systems, and programs for managing efficient processing of commands at storage arrays when received from initiators over a Fibre Channel fabric.

2. Description of the Related Art

Network storage, also referred to as network storage systems or storage systems, is computer data storage connected to a computer network providing data access to heterogeneous clients. Typically network storage systems process a large amount of Input/Output (I/O) requests, and high availability, speed, and reliability are desirable characteristics of network storage.

One way to provide quick access to data is by utilizing fast cache memory to store data. Since the difference in access times between a cache memory and a hard drive are significant, the overall performance of the system is highly impacted by the cache hit ratio. Therefore, it is important to provide optimal utilization of the cache memory in order to have in cache the data that is accessed most often.

There is also a need for storage systems that operate Fibre Channel networks, to provide efficient processing of commands. As Fibre Channel targets generally expose all of their ports to initiators, some initiators often send commands to ports that operate in an ALUA standby (SB) mode. Unfortunately, current processing is not efficient.

It is in this context that embodiments arise.

SUMMARY

Methods and storage systems that enable SCSI-level forwarding of commands is disclosed. In one embodiment, the storage array includes an active controller and a standby controller. The ports of the standby controller are, in one configuration, set to operate in an asymmetric logical unit access (ALUA) standby (SB) mode. For certain ones of the commands received over ALUA SB ports of the standby controller, such commands are forwarded from the standby controller to the active controller via a SCSI-level forwarding connection. Broadly speaking, SCSI-level forwarding includes creation of short lived SCSI I_T_Nexus (ITN) objects on the fly to serve SCSI commands on the active controller. One advantage with this configuration is that on the active controller there is no need to store/update state associated with all ITNs on the standby controller. For example, by utilizing the SCSI-level forwarding, transitions between user space partner processes (e.g., DSD and SFD) are enabled, without terminating a SCSI I_T_Nexus and forcing the initiator to reestablish its connection to the target over the fabric. Commands that are not predefined for forwarding are handled by the user space of the standby controller.

In one embodiment, a method for processing commands by a storage array having an active controller and a standby controller is provided. The standby controller has ports that operate in an asymmetric logical unit access (ALUA) standby (SB) mode. In this embodiment, the method includes receiving a command by a port of the standby controller, when the port operates in the ALUA SB mode. The method also includes identifying that the command is of a type that is predefined for forwarding and forwarding the command from a SCSI layer of the standby controller to a SCSI layer of the active controller. The method further includes processing the command in a user space of the active controller to generate return data and forwarding the return data from the active controller to the standby controller. The method additionally includes sending the return data to the initiator over the port of the standby controller.

In another embodiment, a method for forwarding commands between processes running on a standby controller and an active controller of a storage array is provided. The method includes executing a primary process in user space of the active controller. The primary process is configured to process request commands from one or more initiators in an ALUA active optimized (AO) mode, and the primary process has access to a volume manager for serving data input/output (I/O) requests and non-I/O requests. The method also includes executing a secondary process in the user space of the standby controller. The secondary process is configured to process request commands from one or more of the initiators in accordance with the ALUA standby (SB) mode, and the secondary process does not have access to the volume manger. The secondary process is configured for responding to non-I/O requests. The method also includes receiving a command from an initiator at the standby controller via a port of the standby controller set in the ALUA SB mode and forwarding the command from the user space of the secondary controller to the user space of the primary controller. The command is forwarded when identified as a command that requires processing by the active controller. Then, sending, by the primary process of the active controller, a processed command to the secondary process of the standby controller. The method then includes sending the processed command, by the secondary process of the standby controller, to the initiator.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

Figure 1A:
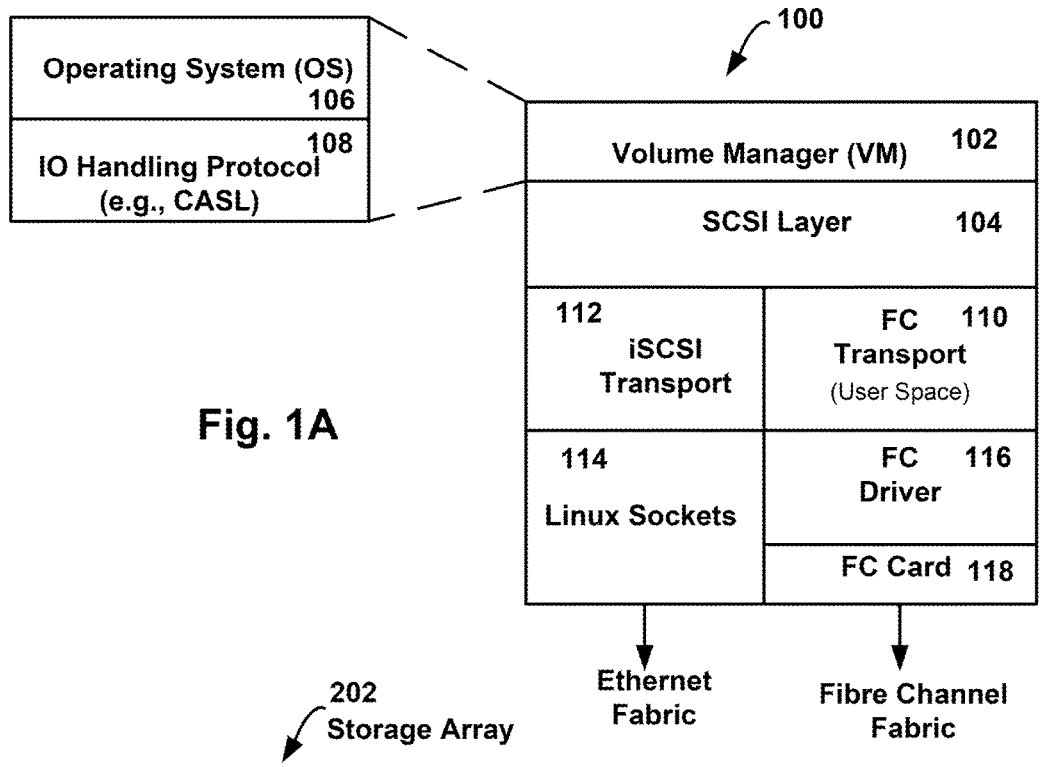
FIG. 1A provides one example view of a storage array SCSI target stack, in accordance with one embodiment.

The following embodiments describe methods, devices, systems, and computer programs for storage arrays that enable SCSI-level forwarding of commands. In one embodiment, the storage array includes an active controller and a standby controller. The ports of the standby controller are, in one configuration, set to operate in an asymmetric logical unit access (ALUA) standby (SB) mode. For certain ones of the commands received over ALUA SB ports of the standby controller, such commands are forwarded from the standby controller to the active controller via a SCSI-level forwarding connection, without the need to retransmit the command back to over the fabric and to the active controller. In one configuration, the SCSI-level forwarding connection is a SCSI nexus connection, e.g., a SCSI I_T_Nexus. For example, by utilizing the SCSI-level forwarding, transitions between user space partner processes (e.g., DSD and SFD) are enabled, without terminating a SCSI I_T_Nexus and forcing the initiator to reestablish its connection to the target over the fabric. In one embodiment, a SCSI forwarding (SFW) module is executed in the user space of the active controller and a user space of the standby controller. The SFW module and the SCSI layer of the active controller and the SCSI layer of the standby controller operate to define the SCSI nexus connection for forwarding commands to the active controller and for forwarding the return data to the standby controller. Commands that are not predefined for forwarding are handled by the user space of the standby controller.

More detail regarding SCSI-level forwarding of commands will be provided with reference to FIGS. 5-8 below.

It should be noted that various embodiments described in the present disclosure may be practiced without some or all of these specific details. In other instances, well known process operations have not been described in detail in order not to unnecessarily obscure various embodiments described in the present disclosure.

One protocol is iSCSI (Internet Small Computer System Interface). iSCSI is used for interconnecting storage arrays to a network, which enables the transport of SCSI commands over Ethernet connections using TCP/IP (i.e., for IP networks). In such configurations, an iSCSI storage implementation can be deployed using Ethernet routers, switches, network adapters, and cabling.

Another protocol is Fibre Channel. Fibre Channel is a high-speed network technology, which is primarily utilized in storage array networks (SANs). Storage arrays are the target devices in a SAN configuration, wherein the fabric and initiators all intercommunicate using the Fibre Channel protocol. Fibre Channel Protocol (FCP) is a transport protocol (similar to TCP used in IP networks) that predominantly transports SCSI commands over Fibre Channel networks.

In accordance with various embodiments described herein, a storage array configurable for Fibre Channel mode or iSCSI mode is provided. The storage array can include logic and hardware to operate in the iSCSI mode and can implement one or more Ethernet cards. To operate in the Fibre Channel mode, the storage array is provided with a Fibre Channel (FC) card (e.g., a hardware card of the controller). The FC card is the link between the Fibre Channel physical network (i.e., PHY) and the Fibre Channel driver (FC) driver of the storage array.

FIG. 1A provides one example view of a storage array SCSI target stack 100. The stack includes a volume manager (VM) 102, which broadly includes the operating system (OS) 106 of the storage array and an I/O handling protocol 108 that processes read and write I/O commands to storage of the storage array. The I/O handling protocol, in one embodiment, is referred to herein as a cache accelerated sequential layout (CASL) process, which intelligently leverages unique properties of flash and disk of the storage array to provide high performance and optimal use of capacity. CASL functions as the file system of the array, albeit processing is generally performed at the block level instead of file level.

Below the VM 102 is a SCSI layer 104, which is configured to handle SCSI commands. In one embodiment, the SCSI layer 104 has been implemented to be independent of iSCSI transport functionality. For example, in storage arrays configured for pure iSCSI mode operation, the iSCSI transport 112 may include logic that is shared by the SCSI layer 104. However, to implement a Fibre Channel operating storage array, the SCSI layer 104 has been implemented to remove dependencies on the iSCSI transport 112. The SCSI target stack 100 further includes a Fibre Channel (FC) transport 110, which functions as user space for running various processes, which are referred to herein as daemons. The user-space of the FC transport 110 serves as the conduit to the SCSI target (i.e., SCSI layer 104).

A Fibre Channel (FC) driver 116 is further provided, which is in communication with a Fibre Channel (FC) card 118. In one embodiment, in order to interact with the FC card 118, which is a dedicated hardware/firmware, a dedicated FC driver 116 is provided. For each FC card 118 (i.e., port) in an array, an instance of the FC driver 116 is provided. The FC driver 116 is, in one embodiment, a kernel level driver that is responsible for interacting directly with the FC card 118 to retrieve incoming SCSI commands, request data transfer, and send SCSI responses, among other things. In one embodiment, the FC card 118 may be an adapter card, which includes hardware, firmware and software for processing Fibre Channel packets between the Fibre Channel fabric and the FC driver. In one specific example, the FC card 118 may be a Fibre Channel Host Bus Adapter (HBA) card. If the storage array is configured for iSCSI mode, Linux sockets are used to communicate with a TCP/IP network interface card (NIC), for communication with an Ethernet fabric.

Figure 1B:
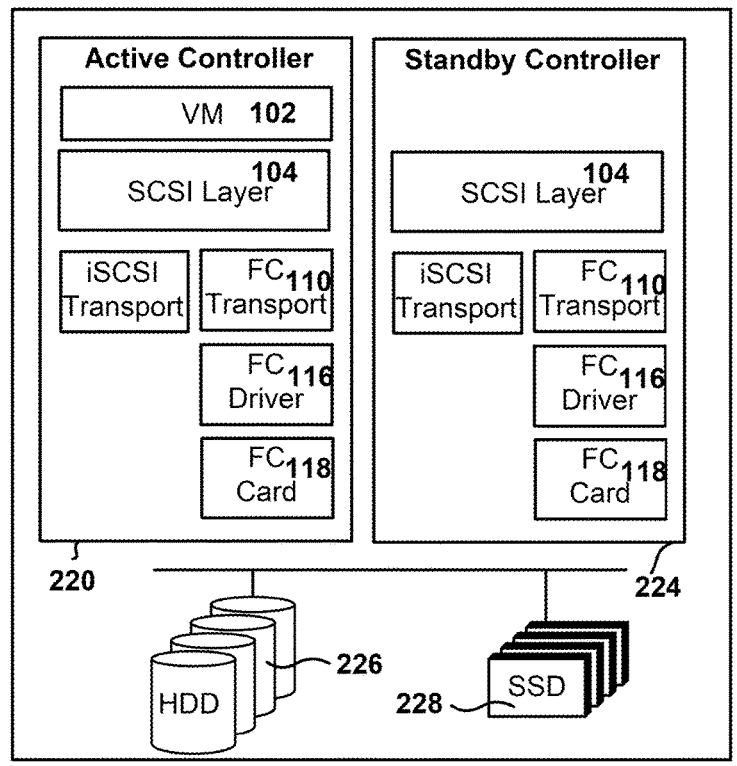
FIG. 1B illustrates an example of a storage array having an active controller and a standby controller, in accordance with one embodiment.

FIG. 1B illustrates an example of a storage array 202, which includes an active controller 220, a standby controller 224, and storage (i.e., hard disk drives (HDDs) 226, and solid state drives (SSDs) 228). This configuration shows the storage array SCSI target stack 100 usable in each of the active and standby controllers 220 and 224, depending on the state of operation. For example, if the active controller 220 is functioning normally, the standby controller is not serving IOs to and from the storage, and ports of the standby controller are simply operational in a standby (SB) state in accordance with an asymmetric logical unit access (ALUA) protocol. The ALUA protocol is described in more detail in a Fibre Channel standard, entitled "*Information technology-SCSI Primary Commands*-4 (*SPC*-4)", revision 36s, dated 21 Mar. 2014 (Project T10/BSR INCITS 513), which is incorporated herein by reference. Generally speaking, ALUA is a multi-pathing method that allows each port to manage access states and path attributes using assignments that include: (a) active/optimized (AO); (b) active/non-optimized (ANO); (c) standby (SB); unavailable (UA); and (d) logical block dependent (LBD).

In the example of FIG. 1B, it is noted that the standby controller 224 may not have the iSCSI transport 112 during the time it operates as a "standby" controller. If failover occurs and the standby controller 224 becomes the active controller 220, then the iSCSI transport 112 will be populated. Note also, that during Fibre Channel operation, the FC transport 110 is the module that is in operation. Alternatively, if the storage arrays are used in an iSCSI configuration, the iSCSI transport 112 will be needed, along with the Linux Sockets 114 to enable Ethernet fabric communication.

Figure 1C:
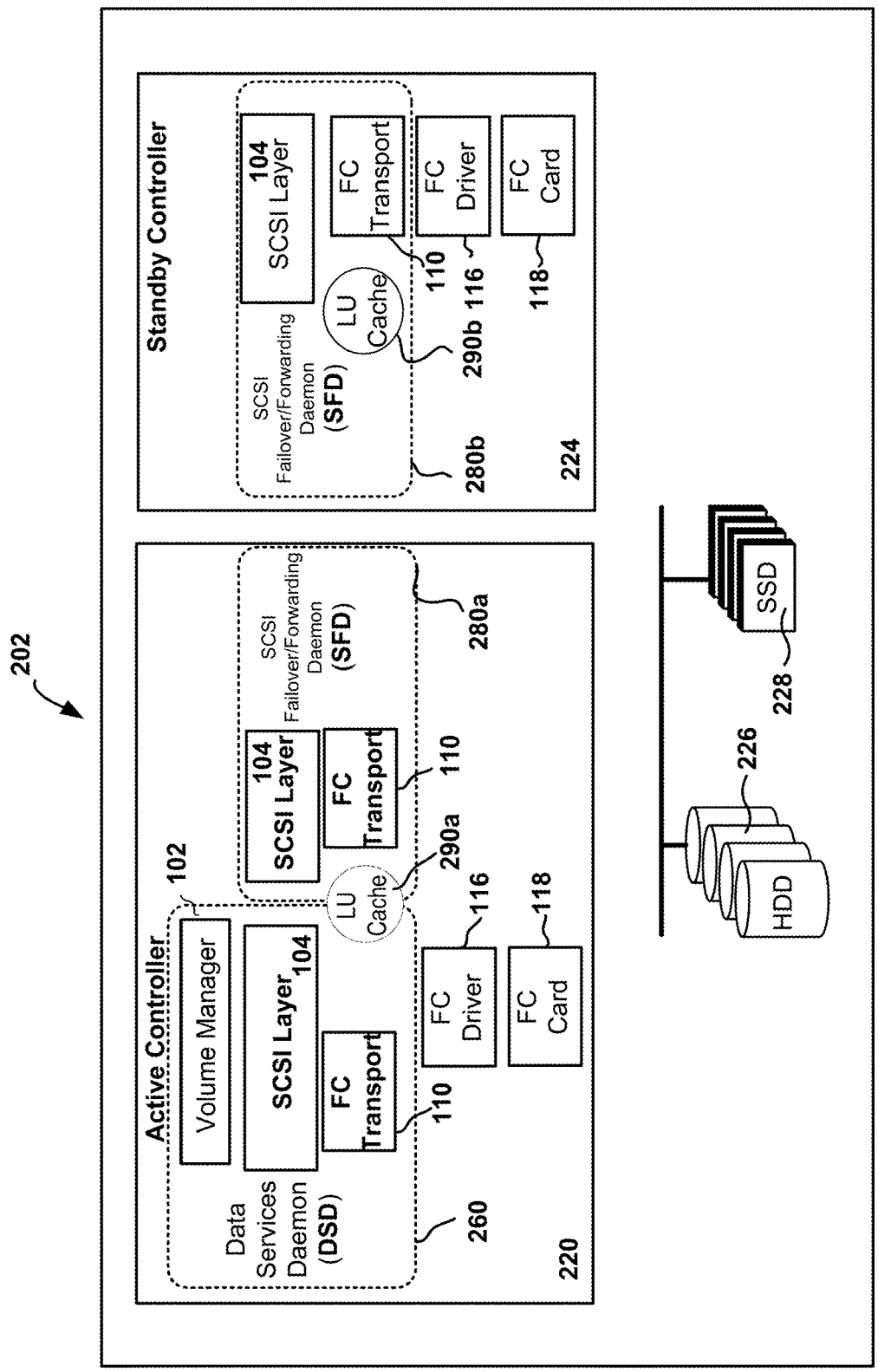
FIG. 1C shows an example of the active controller, which is configured with a data services daemon (DSD) and a SCSI Failover/Forwarding daemon (SFD), in accordance with one embodiment.

FIG. 1C shows an example of the active controller 220, which is configured with a data services daemon (DSD) 260. DSD 260 is designed to provide full access to the storage array 202 via the VM 102, which includes serving IOs to the volumes of the storage array 202 (e.g., in response to initiator access requests to the SCSI target storage array 202). The DSD 260 of the active controller 220 is a user space process. For failover capabilities within the active controller 220 itself, the user space of the active controller 220 also includes a SCSI failover/forwarding daemon (SFD) 280*a*. The SFD 280*a* is configured as a backup process that does not process IOs to the volumes of the storage array 202, but can provide limited services, such as responding to information SCSI commands while the DSD 260 is re-started (e.g., after a crash). In one embodiment, SFD may also be referred to as standby failover daemon.

If the SFD 280*a* takes over for the DSD 260, the I_T_Nexus (i.e., connection) between initiators and the target array remain un-terminated. As will be described in more detail below in reference to a port-grab mechanism, during the transition between DSD 260 and SFD 280*a*, the FC driver 116 can transition between user space partner processes (e.g., DSD/SFD), without terminating the SCSI I_T_Nexus and forcing the initiator to reestablish its connection to the target.

The standby controller 224 of the storage array 202 is also configured with an SFD 280*b* in its user space. As noted above, the ports of the standby controller 224 are set to standby (SB) per ALUA. If a command is received by the SFD of the standby controller, it can process that command in one of three ways. In regard to a first way, for many commands, including READ and WRITE, the SCSI standard does not require the target to support the operation. For this case, SFD 280*b* returns the SCSI response prescribed by the standard to indicate non-support. In a second way, among the mandatory-to-support SCSI commands, there are certain commands for which initiators expect quick response under all conditions, including during failover.

Examples include, without limitation, INQUIRY, REPORT_LUNS, and REPORT_TARGET_PORT_GROUPS. For these commands, SFD 280*b* responds locally and independently. In a third way, for other mandatory-to-support SCSI commands (such as PERSISTENT_ RESER-VATION_IN/OUT), the SFD 280*b* will depend on the DSD 260 process running on the active controller 220. Thus, a forwarding engine is used to forward SCSI commands from the standby controller 224 to the active controller 220. The active controller 220 will process the commands and send responses back to the standby controller 224, which will in turn send them to the initiator.

For commands that need to be processed locally, all information required to create an accurate and consistent SCSI response will be stored locally in an LU cache 290. As will be described in more detail below, a logical unit (LU) cache will be present on each of the active and standby controllers 220/224, and consistency methods ensure that all LU cache states are updated. The SFD 280*a/b* uses the LU cache 290 to independently respond to a small number of commands, such as Inquiry, Report LUNs and RTPG.

Furthermore, in Fibre Channel, each FC transport endpoint is identified by a Fibre Channel (FC) World Wide Node Name (WWNN) and World Wide Port Name (WWPN). It is customary and expected that all ports for a given target advertise the same single WWNN. The client OS storage stack will establish a single FC connection to each available FC transport endpoint (WWNN/WWPN pair). In some embodiments, when the FC requires a separate WWNN/WWPN pair for each target, the single-LUN target model would require a separate WWNN/WWPN pair for each exported volume. It should be understood that Single-LUN target models are just one example, and other configurations that are not Single-Lun target may also be implemented in some configurations. In one example of storage array 202, it may have two FC transport endpoints for each of the active controller 220 and the standby controller 224. That is, the active controller 220 may have two ports (i.e., two WWNN/WWPN pairs), and the standby controller 224 may also have two ports (i.e., two WWNN/WWPN pairs). It should be understood that the configuration of the storage array 202 may be modified to include more or fewer ports.

The LUN mapping is configured to persistently store the mapping information and maintain consistency across reboots. The LUN mapping is stored in the LU cache 290. The DSD 260 and SFD 280*a* and 280*b* are provided with direct access to the LU cache 290. As will be described below in more detail, the LU cache 290*a/b* will also store inquiry data and port state information. In one embodiment, as described with reference to FIGS. 3A and 3B below, a GDD 297 (Group Data Daemon) and a GMD 298 (Group Management Daemon) may be used to maintain LUN mapping information for each initiator. GDD 297, from SCSI perspective, is configured to work with SCSI layer 104 to handle SCSI Reservation and TMF (task management function). In one embodiment, GDD 297 will support iSCSI login and connection re-balancing for when the storage array 202 is configured/used as an iSCSI target. In one configuration, GDD 297 and GMD 298 operate as a configuration management unit 291.

It will be apparent that the present embodiments may be practiced without some or all of these specific details. Modification to the modules, code and communication interfaces are also possible, so long as the defined functionality for the storage array or modules of the storage array is maintained. In other instances, well-known process operations have not been described in detail in order not to unnecessarily obscure the present embodiments.

Storage Array Example Structure

Figure 2:
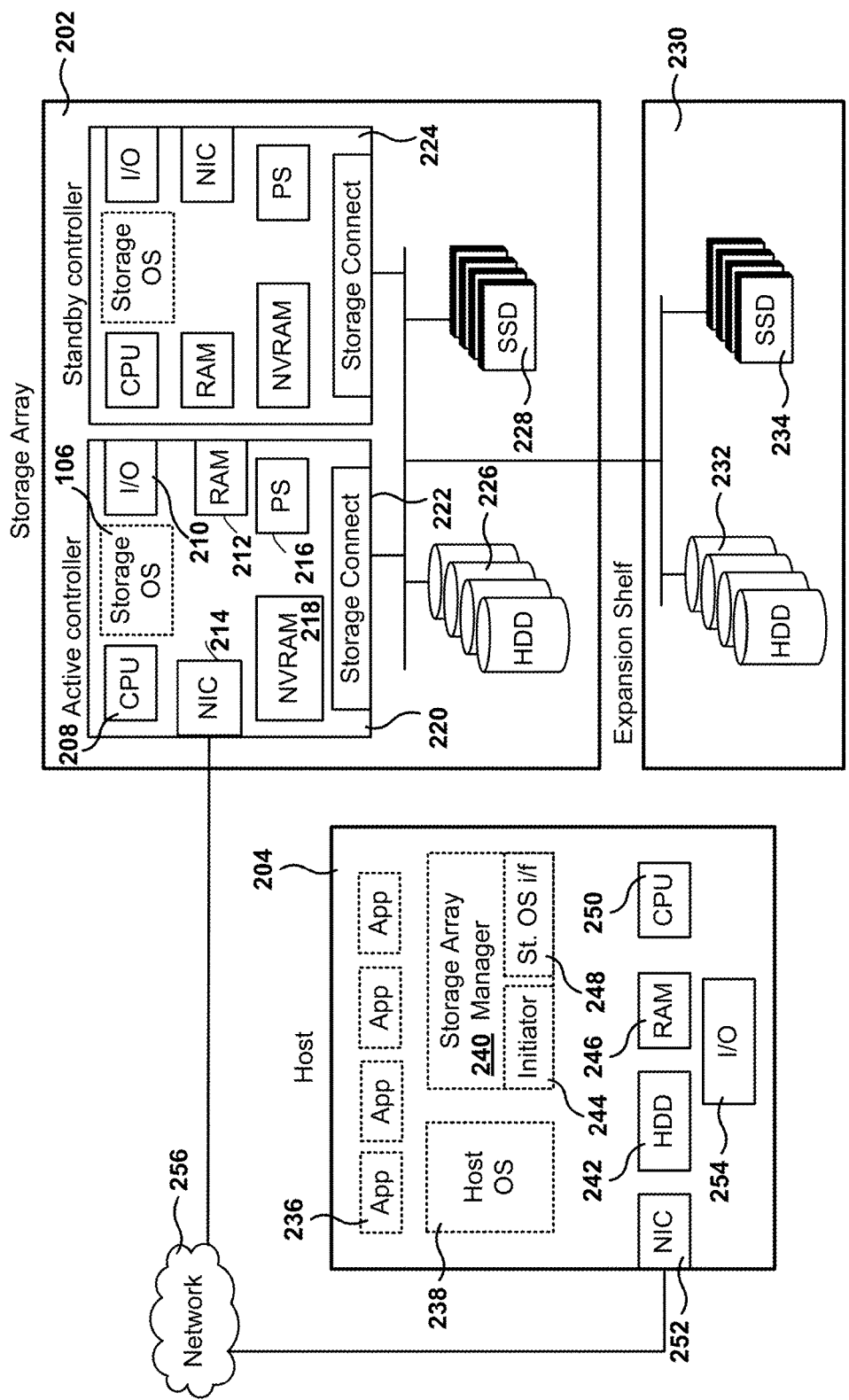
FIG. 2 illustrates an example of the architecture of a storage array, according to one embodiment.

FIG. 2 illustrates an example of the architecture of a storage array 102, according to one embodiment. In one embodiment, storage array 102 includes an active controller 220, a standby controller 224, one or more HDDs 226, and one or more SSDs 228. In one embodiment, the controller 220 includes non-volatile RAM (NVRAM) 218, which is for storing the incoming data as it arrives to the storage array. After the data is processed (e.g., compressed and organized in segments (e.g., coalesced)), the data is transferred from the NVRAM 218 to HDD 226, or to SSD 228, or to both.

In addition, the active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 226 and SSD 228. In one embodiment, the NICs 214 may be configured for Ethernet communication or Fibre Channel communication, depending on the hardware card used and the storage fabric. In other embodiments, the storage array 202 may be configured to operate using the iSCSI transport or the Fibre Channel transport.

Active controller 220 is configured to execute one or more computer programs stored in RAM 212. One of the computer programs is the storage operating system (OS) used to perform operating system functions for the active controller device. In some implementations, one or more expansion shelves 230 may be coupled to storage array 202 to increase HDD 232 capacity, or SSD 234 capacity, or both.

Active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM. If the active controller 220 fails, standby controller 224 takes over the management of the storage array 202. When servers, also referred to herein as hosts, connect to the storage array 202, read/write requests (e.g., I/O requests) are sent over network 256, and the storage array 202 stores the sent data or sends back the requested data to host 204.

Host 204 is a computing device including a CPU 250, memory (RAM) 246, permanent storage (HDD) 242, a NIC card 252, and an I/O module 254. The host 204 includes one or more applications 236 executing on CPU 250, a host operating system 238, and a computer program storage array manager 240 that provides an interface for accessing storage array 202 to applications 236. Storage array manager 240 includes an initiator 244 and a storage OS interface program 248. When an I/O operation is requested by one of the applications 236, the initiator 244 establishes a connection with storage array 202 in one of the supported protocols (e.g., iSCSI, Fibre Channel, or any other protocol). The storage OS interface 248 provides console capabilities for managing the storage array 202 by communicating with the active controller 220 and the storage OS 106 executed therein. It should be understood, however, that specific implementations may utilize different modules, different protocols, different number of controllers, etc., while still being configured to execute or process operations taught and disclosed herein.

As discussed with reference to FIGS. 1A-1C, in a storage array 202, a kernel level process occurs at the FC driver 116, which is charged with communicating down with the Fibre Channel (FC) card 118. The FC card 118, itself includes firmware that provides the FC processing between the FC driver 116 and the physical network (PHY) or Fibre Channel fabric. In the illustrated configuration, the FC driver 116 is in direct communication with the user space, which includes the FC transport 110, the SCSI layer 104.

Figure 3A:
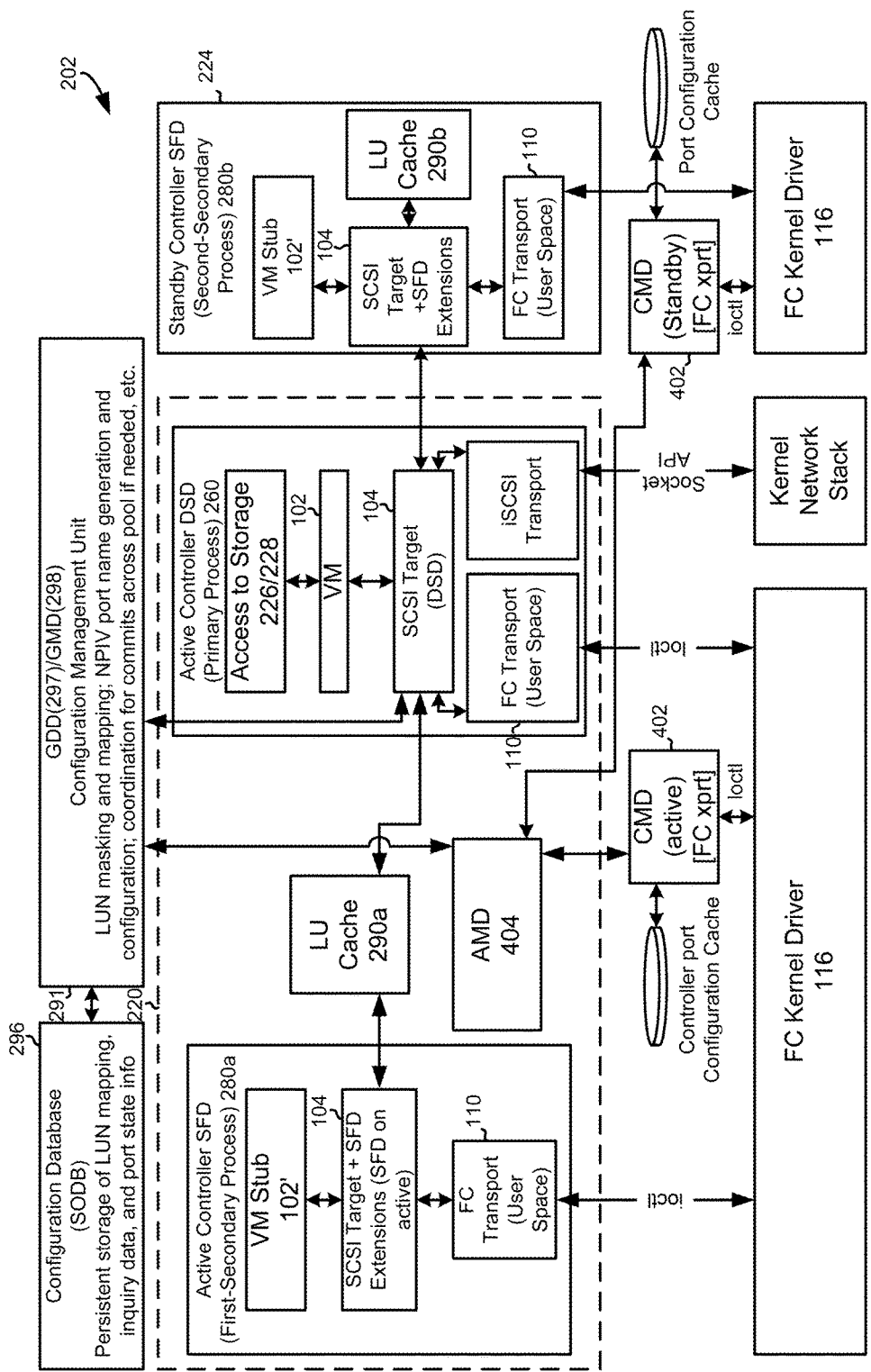
FIGS. 3A and 3B illustrate example logical diagrams of a storage array, which includes an active controller and a standby controller, in accordance with two embodiments.

FIG. 3A illustrates an example logical diagram of a storage array 202, which includes an active controller 220 and a standby controller 224. The active controller 220 is shown to include DSD 260 and SFD 280a, while the standby controller 224 includes an SFD 280b. Generally speaking, the DSD 260 is a primary process and the SFD 280a and SFD 280b are secondary processes. In one embodiment, the DSD 260 running on the active controller 220 is provided with access to a fully functioning volume manager (VM) 102, while the SFD 280a of the active controller 224 and the SFD 280b of the standby controller 224 are only provided with a VM stub 102'. This means that VM stub 102' is not provided with access to the storage of the storage array 202. For example, the SCSI layer 104 may make calls to the VM stub 102', as the code used for the DSD 260 may be similar, yet a code object is used so that an error or unavailable response is received from the VM stub 102', as no access to the VM is provided. Also shown is that the SFD 280a on the active controller 220 and the DSD 260 have access to the LU cache 290a. As noted above, the LU cache 290a is configured to store available LUN mapping, inquiry data and port state information. The standby controller 224 also includes an SFD 280b that has access to LU cache 290a.

As noted, a SCSI logical unit is visible through multiple Fibre Channel ports (namely, all of the ports which reside on arrays within the logical unit's pool). An initiator may issue a SCSI command to any of these ports, to request the port state for all ports through which the logical unit may be accessed. In one embodiment, this requires a CMD 402 (Controller Management Daemon) to monitor port state for FC target ports on a given array 202, report initial state and state changes to AMD 404 (Array Management Daemon). The AMD 404 will forward this information to GDD 297. GDD 297 is a clearing house for all FC target ports in the entire group, and will disseminate this information to DSD 260. DSD 260 will retrieve the port state and store it into the LU cache 290a.

In one embodiment, the SCSI layer 104 within DSD 260 and SFD 280 will need access to several pieces of system information, in order to process SCSI commands. This information includes LUN mapping information, e.g. to build REPORT_LUNS responses, and to validate and map a logical unit number to its associated volume. The SCSI layer 104 will need access to the FC port state to build REPORT_TARGET_PORT_GROUPS response, and to determine the port_identifier fields for certain SCSI INQUIRY responses. The LU cache 290a, being accessible to DSD 260 and SFD 280a will enable memory-speed access to the LU cache 290a. The DSD 260 is, in one embodiment, configured to build the LU cache 290a so it can quickly retrieve the needed LUN mapping and port state information from GDD 297 and make this information available to SFD 280a and 280b processes. The SFD 280b on the standby controller 224 maintains communication with DSD 260 on the active controller 220, to maintain an up-to-date copy of LU cache 290b.

At startup, DSD 260 needs an up-to-date LU cache 290a in order to handle incoming SCSI commands. Therefore, during startup, DSD 260 needs to retrieve from GDD 297 the LUN mapping configuration and current port state information, and populate the LU cache 290a (or verify the validity of the existing LU cache 290a). DSD 260 also needs to notify the SFD 280b on the standby controller 224 if the LU cache 290a contents are updated. DSD 260 also needs to interact with the FC kernel driver 116, to claim responsibility for current and future SCSI I_T nexuses and commands.

Thus, in order for DSD 260 to process non LU_CACHE-variety commands directed to a specific logical unit (e.g. READ and WRITE), the contents of the LU cache 290a is necessary, but not sufficient. The SCSI layer 104 within DSD 260 consults the LU cache 290a in order to validate the specified LU number, and to map the LU number to a backing-store volume. Then the SCSI command handler can process the command to the proper volume.

On the active controller 220, if the SFD 280b gains access (i.e., via port grab when DSD 260 goes down), SFD 280b will get the latest copy of the LU cache, as previously populated by DSD 260, which may be by directly accessing a shared memory segment. Thus, whenever DSD 260 is unavailable (e.g. crashed or is restarting), SFD 280a services certain SCSI commands. For LU_CACHE-variety commands, SFD 280a fully processes the commands using only information from the LU cache 290a. For other commands, SFD 280a returns appropriate responses indicating that the command could not be immediately completed.

On the standby controller 224, SFD 280b always responds to certain incoming SCSI commands. For LU_CACHE-variety commands, SFD 280b fully processes the commands using only information from the LU cache 290b. For commands which constitute LUN-level serializing events (e.g. SCSI Reservations, LUN_RESET), interaction with GDD 297 is required by the DSD 260 which is providing access to the affected LUN. In one embodiment, SFD 280b on the standby controller 224 is not permitted to communicate directly with GDD 297, so this is achieved using a proxy service provided for this purpose by DSD 260 on the active controller 220. If DSD 260 is available, the command is handled using this DSD proxy service. If DSD 260 is not available, error response is provided. For other commands, SFD 280b returns SCSI responses as appropriate for such commands received on ALUA standby ports.

In general and in one configuration, the two processes (e.g., primary process (DSD 260) and secondary process (SFD 280)) provide various advantages and efficiencies in storage architectures. One technical advantage is seamless transition from standby-mode to full active-optimized mode on the standby controller, as it becomes the active controller. Another technical advantage is reduced disruption on a single controller during short periods of DSD 260 down time (e.g. DSD crashes, but failover not triggered).

In one configuration, a storage array 202 includes an active controller 220 and a standby controller 224. As mentioned above, the LU cache 290a is a module shared by DSD 260 and SFD 280a that caches data needed to serve certain SCSI commands. With multi-LUN target Fibre Channel, the SFD 280a will also be serving SCSI commands, but SFD 280a does not have access to VM 102. Multi-LUN target is an implementation that requires tracking of LUN to Volume mappings. LU cache 290a is designed as a way for SFD 280a to provide volume attribute and LUN inventory information to the SCSI layer 104 in the absence of VM 102 access.

Conceptually, LU cache 290a sits between the SCSI layer 104 in DSD 260 and SFD 280a (i.e., user space), and the configuration information is stored in a configuration database 296, referred to herein as a scale-out database. As an advantage, the configuration database 296 stores configuration information, which may be used for scale-out and non-scale out implementations. The configuration database 296, in one embodiment, is designed as a persistent storage of LUN data (e.g., LUN inventory information (i.e., LUN mapping), inquiry data, port state info, etc.), which is provided to the DSD 260 by GDD 297 (e.g., based on changes made using GMD 298). The configuration database 296 is generally storing configuration data. LU cache 290a presents access interfaces to SCSI layer 104 and modifier interfaces to GMD 298 and GDD 297. In one embodiment, the GMD 298 and GDD 297 are collectively operating as a configuration management unit 291 for the array 202, as shown in FIG. 3A. The configuration management unit 291, e.g., one or both of GDD 297 and GMD 298, is further shown interfaced with the configuration database 296. In one embodiment, LU cache 290 is implemented as a library linked in by SFD 280a, DSD 260 and GDD 297.

In one embodiment, the configuration management unit 291 includes GDD 297 and GMD 298. In specific examples, GMD 298 (Group Management Daemon) is a process primarily responsible for system management of a storage group. A storage group is a cluster of arrays with a single shared management plane. In one example, GMD 298 provides APIs (programmatic interfaces) and CLIs (command line interfaces) by which administrators can perform management operations, such as provisioning and monitoring storage. In one example, GDD 297 (Group Data Daemon) is a process responsible for coordinating distributed data path operations in a storage group. For example, this may include acquiring and checking SCSI reservations, and iSCSI login permissions.

GMD 298 and GDD 297 further provide an interface to SODB (i.e., the configuration database 296), which is a persistent store for configuration information in a storage group, and it communicates with DSD 260, AMD 404, and other processes to perform management activities. The information in LU cache is a subset of the information in SODB. LU cache is initialized by fetching data from GDD 297, and then incremental updates are applied via GMD 298.

Figure 3B:
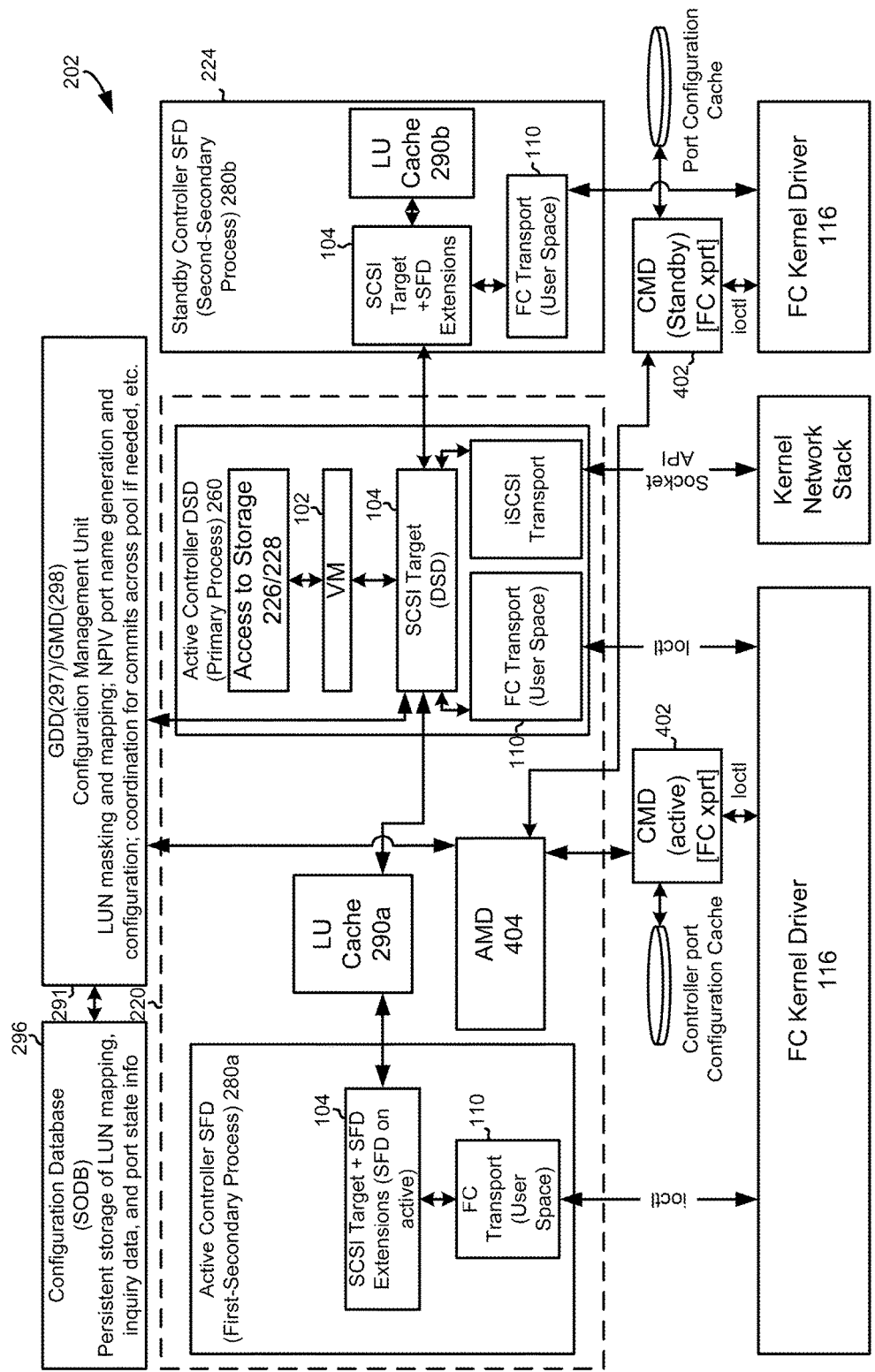

FIG. 3B illustrates another embodiment, wherein the VM stubs 102' are not part of the design. In this embodiment, different SCSI layer 104 libraries are used for SFD 280 (i.e., 280a and 280b) and DSD 260. By providing different SCSI layer 104 libraries for SFD 280 and DSD 260, calls made to the VM 102 via the SCSI layer 104 of either the active controller SFD 280a or the standby controller SFD 280b will not be provided with access to the VM 102. In one embodiment, an error may be returned or an unavailable response may be returned by the SCSI layer 104 library of the respective SFD 280. In one embodiment, the SCSI layer 104 of the SFD 280a and 280b implement error handling, which avoids the need for a VM stub 102'. On the other hand, if the SCSI layer 104 of the active controller DSD 260 receives the request to access the VM 102, access will be provided.

Figure 4:
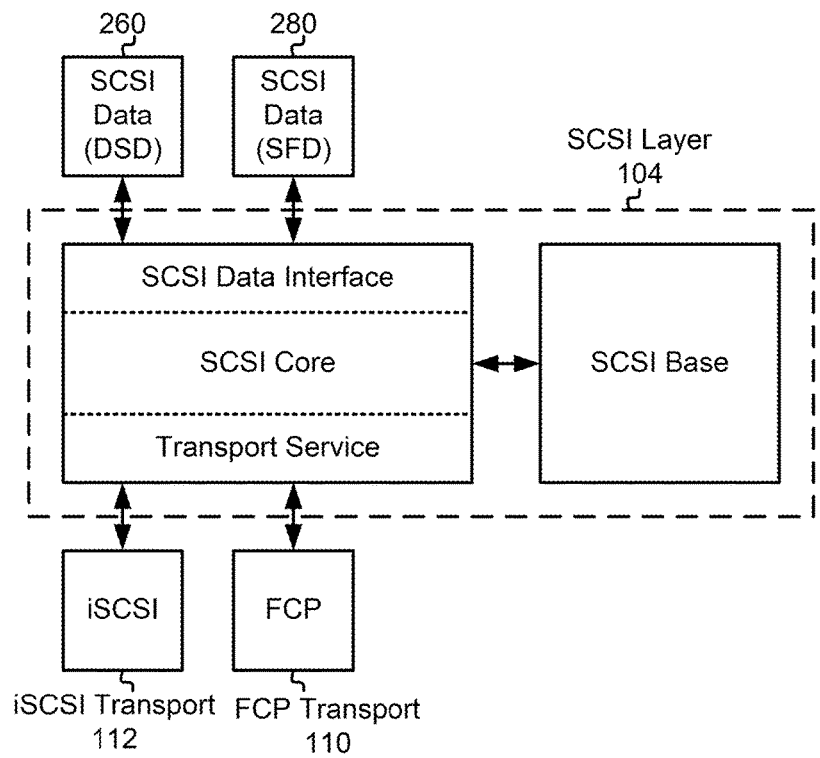
FIG. 4 illustrates an example of processing modules associated with a SCSI layer, and the interface between the DSD and SFD, in accordance with one embodiment.

FIG. 4 illustrates one example of the segmentation of modules of the SCSI layer 104, in accordance with one example. As shown, the SCSI layer 104 is defined by a SCSI Core with a SCSI Data interface for interacting with DSD 260 data and SFD data 280. The SCSI layer 104 also includes a Transport Service for interacting with the iSCSI transport 112 and the Fibre Channel Transport (FCP) 110. Further, the SCSI Core is interfaced with a SCSI Base module. SCSI Base is a module that provides common definitions and interfaces that will be shared by GDD 297 and DSD 260/SFD 280. These common definitions and interfaces include ScsiLuBase, common SCSI protocol opcode and data structures as defined by standards, common MXS (message exchange service)/RPC (remote procedure call) definitions, data structures, etc. In one configuration, the SCSI Core is a module that is shared by both DSD 260 and SFD 280. SCSI Core provides sharable common definitions and implementations related to ScsiTgt, ScsiLu, ScsiITN, ScsiCmd, ScsiTmf, etc. In one embodiment, definitions from this module can be pulled into iSCSI, FCP, SCSI Data. In one embodiment, as SFD 260 includes this module, it will not have references to VM 102, Dsbase. In this example implementation, SCSI Core also provides interfaces to transport protocols (TSAPI) and SCSI Data module.

SCSI Data is a module that implements process specific (DSD 260 or SFD 280) data operations. In one configuration, there will be two different implementations of SCSI data module: one for DSD 260 and the other for SFD 280. In this example, SCSI core provides an interface to SCSI data module which contains a singleton class pointer for each implementation to fill in at initialization and a few interface methods via virtual functions, for example.

Figure 5:
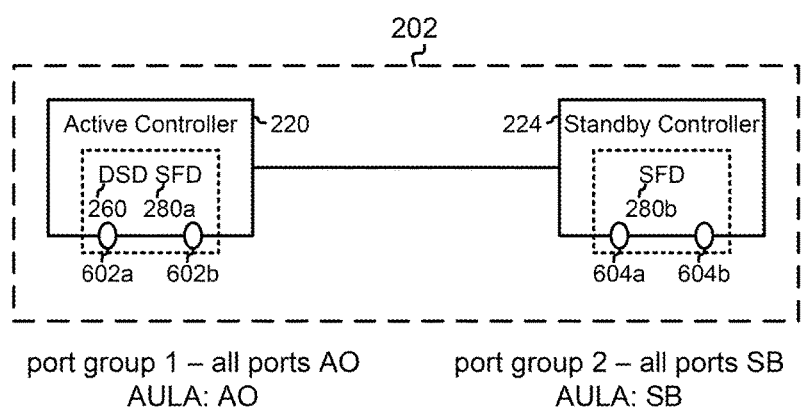
FIG. 5 illustrates an example of an active controller and standby controller, and associated ALUA standard modes, in accordance with one embodiment.

FIG. 5 shows a storage array 202 that includes an active controller 220 and a standby controller 224. In one implementation, the storage array 202 is configured as a Fibre Channel (FC) array. In this example, the active controller 220 has two ports 602*a* and 602*b* and the standby controller has two ports 604*a* and 604*b*. In Fibre Channel, all four ports 602*a*, 602*b*, 604*a* and 604*b* are visible to the fabric (i.e., to initiators). Thus, the standby controller 224 has its ports 604*a* and 604*b* set to ALUA standby (SB), while the active controller 220 has its ports 602*a* and 602*b* set to ALUA active optimized (AO). This means that the standby controller 224 may receive commands from initiators. Some commands can be handled locally by a SCSI failover/forwarding daemon (SFD) 280*b*, such as Inquiry, Report Target Port Groups (i.e., port state info) and Report LUNs (i.e., LUN mapping). In some cases, as noted below, the SFD 280*b* may use a proxy service to have the data services daemon (DSD) 260 process the commands for the SFD 280*b*, which are then returned to the SFD 280*b* for responding to the initiator.

In one embodiment, the active controller 220 is configured for servicing input/output (I/O) commands to the volumes via volume manager (VM) 102, as it is provided with access to the VM 102 of the storage array 202, and the standby controller 224 does not have access to the VM 102. An example of this is shown in FIG. 3A, which shows that the SFD 280*a* and 280*b* only having access to VM stubs 102', and not access to storage 226/228 as does VM 102 of the active controller 220 that runs the DSD 260. FIG. 3B illustrates an embodiment where the SCSI layer 104 of the standby controller 224 can itself process instructions without the use of a VM stub 102'.

In one embodiment, the active controller 220 is configured with user space that has full access to the data, e.g., using the data services daemon (DSD) 260 via VM 102. The standby controller 224 is configured with a user space process, e.g., SCSI failover/forwarding daemon (SFD) 280*b* that can service limited commands. In one configuration, the SFD 280*b* in the standby controller 224 is configured with a SCSI layer 104, just as the active controller 220 is configured with its own SCSI layer 104. See for example, FIG. 1C, SCSI layer 104. In FIGS. 3A and 3B, the SCSI target sits between the VM 102 and the FC transport 110.

In one embodiment, SCSI-level forwarding includes creation of short lived SCSI I_T_Nexus (ITN) objects inside of DSD 260, on-the-fly, to serve SCSI commands on the active controller 220 (i.e., process forwarded commands on behalf of SFD 280). One advantage with this configuration is that on the active controller 220 there is no need to store/update state associated with all ITNs on the standby controller 224. Typically, ITNs on standby controller 224 will not need to forward many commands. For those commands that do need forwarding, the short-lived ITN objects are optimized for the disclosed forwarding of SCSI commands.

Figure 6:
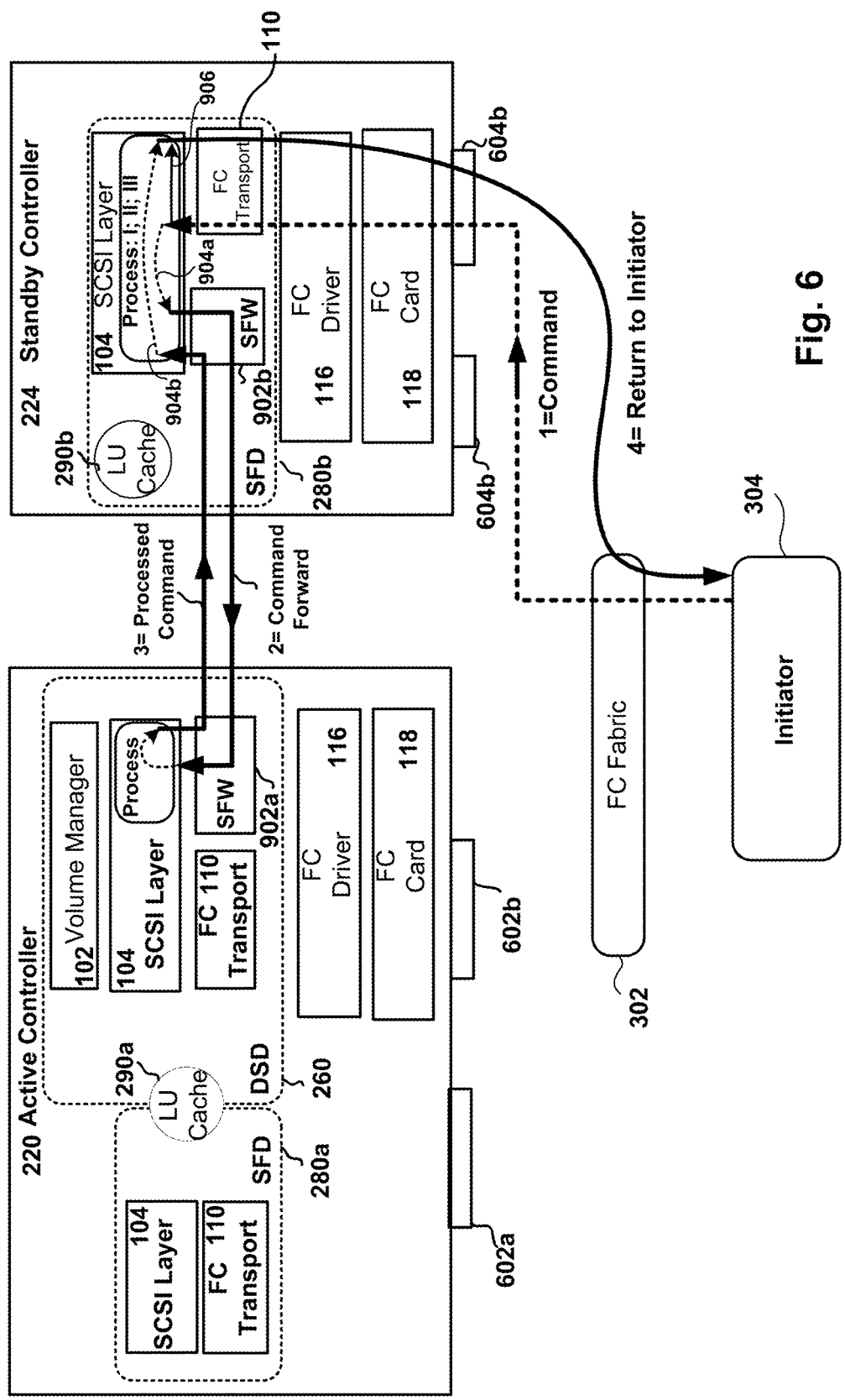
FIG. 6 illustrates an example process and hardware associated with command forwarding, when certain commands are received at a port of the standby controller, in accordance with one embodiment.

FIG. 6 illustrates one embodiment of a command forwarding operation between the standby controller 224 and the active controller 220. As shown, a SCSI forwarding (SFW) module 902*a* on the active controller 220 and SFW 902*b* on the standby controller 224, is configured in user space to establish an IT nexus via the SCSI layer. In one embodiment, SCSI commands received by the SFD 280*b* for ALUA standby mode are processed by the SCSI layer 104 of the standby controller 224 in accordance with at least three processes, e.g., processes I, II, and III.

In process I, commands are processed locally, to completion. These commands include, for example and without limitation, REPORT LUNS, INQUIRY, REPORT TARGET PORT GROUPS. In process II, commands are also processed locally, with SCSI Check Condition responses. These commands may include, without limitation, READ, WRITE commands. In process III, commands are processed using SFW 902 module for command forwarding. These commands may include, without limitation to others, PERSISTENT RESERVE IN, PERSISTENT RESERVE OUT, and LOG SENSE. PERSISTENT RESERVE IN is used by the initiator to read information on the target about existing reservations and registrations. PERSISTENT RESERVE OUT is used by the initiator to register, set and alter its reservations, and break reservations for error recovery. A LOG SENSE command is used to fetch log pages. Generally speaking, the commands noted above are just examples, and it should be understood that the system and methods can be adjusted to forward any type of command, depending on the desired implementation. In general, a command is forwarded if the following conditions apply. For example, it is a command (1) that does not have to be supported in ALUA Transition state as per SCSI spec, and (2) that cannot be served locally by SFD in the standby controller because the command has to access information that lives outside. Examples of such information may include, without limitation, Persistent Reservation keys table is in SODB, which can only be accessed by processes running on the group leader array's active controller, and Log Sense needs of real time data from VM 102, which is available in the active controller's DSD process. Generally speaking, the embodiments of this disclosure are applicable to any SCSI command that needs or benefits from forwarding from the standby controller 224 to the active controller 220, for processing by the primary process (e.g., DSD 260) of the active controller 220. As noted above, one embodiment includes creation of short lived ITN objects, on-the-fly, to serve SCSI commands on the active controller 220, on behalf of SFD 280.

Still referring to FIG. 6 further details regarding command forwarding, e.g., process III, will now be provided. For ease of illustration, an example flow path of ALUA forwarded commands will be broadly shown with reference to operations [1] to [4]. Therefore, when commands qualifying for command forwarding [1] arrive at the SCSI layer 104 of the standby controller 224, the SCSI layer 104 cooperates with the SFW 902*b* of the standby controller 224. SFW 902*b* is a user space module, as is the SFW 902*a* of the active controller 220. The SFW 902*b* module executes instructions to conduct SCSI level forwarding [2] of the command to the SFW 902*a* of the active controller 220. In one embodiment, the forwarding uses an IT nexus to forward the SCSI command (e.g., command of initiator 304) to the SCSI layer 104 of the active controller 220 for servicing.

As shown, the command [1] may be forwarded to port 604*b* (e.g., which may be operating as ALUA standby (SB)), then to the FC card 118, the FC driver 116, the FC transport 110, the forwarding process of the SCSI layer 104, the SFW 902*b* module, the command forwarding [2] to the SFW 902*a* of the active controller 220, and the SCSI layer 104 of the active controller 220 for processing. The SCSI layer 104 of the active controller 220 will then process the command that it received and returns [3] the processed command via SFW 902*a* to the SFW 902*b* of the standby controller 224. The SCSI layer 104 will then return [4] the processed command back to the initiator. Of course, this example shows that the initiator sent the command to port 604*b*, but this process can work for any port of the standby controller 224, which is set to function in the ALUA SB mode.

For process I and II, the local processing and return is illustrated by arrow 906, which returns directly [4] to the initiator after being processed by the process in the SCSI layer 104. As noted above, for process I, example process handling can be for REPORT LUNS, INQUIRY, REPORT TARGET PORT GROUPS data may be returned. The processes handled by process I, however, are just examples, and any other types of commands can be processed without ALUA forwarding, depending on the designed implementation. For process II, Check Condition SCSI responses may be returned, for example, indicating that a WRITE and READ are not allowed from the port of the standby controller 224. The write and read responses returned by the standby controller 224 are just examples, and it should be understood that other types of errors, exceptions, warnings, messages, flags, alerts, codes or signals may be generated in response to process II handling.

Accordingly, the forwarding of SCSI commands, in conjunction with the ALUA settings of the ports 604*a/b* (i.e., ALUA SB), acts to forward SCSI commands, so that the DSD 260 of the active controller 220 can process the forwarded commands for the SFD 280*b* of the standby controller 224.

This processing adds an extra layer of exchange between the active controller 220 and the standby controller 224. Further, the forwarding also ensures that commands sent to the standby controller 224, even though they are not for data I/O handling, can be serviced by the functionality of the active controller 220 (as the standby controller 224 cannot).

In one embodiment, the volume manager 102 should be available on the active controller 220, to process the forwarded commands. This forwarding is SCSI-level forwarding, and is distinct from any forwarding mechanism inherent in the volume manager (e.g., function of the storage OS). As the standby controller 224 is implementing ALUA SB, the forwarding does not need to traverse the stack and communicate over the fabric 302 twice. Instead, commands are processed at the SCSI layer 104 of both the active and standby controllers. For example, without SCSI-level forwarding, commands sent to the standby ports 604*a* and 604*b* (which are in ALUA standby (SB) mode), will traverse the stack up to the SCSI layer 104 of the standby controller 224, and then back up the active controller 220 (operating in ALUA active optimized (AO)). Therefore, the method of processing and systems programmed in the storage array 202 will enable efficient ALUA SB forwarding at the SCSI-level, thus improving the system's behavior to commands received from initiators 304. If the standby controller 224 implements ALUA non-optimized, then all SCSI commands not handled locally will be forwarded to DSD 260.

Figure 7:
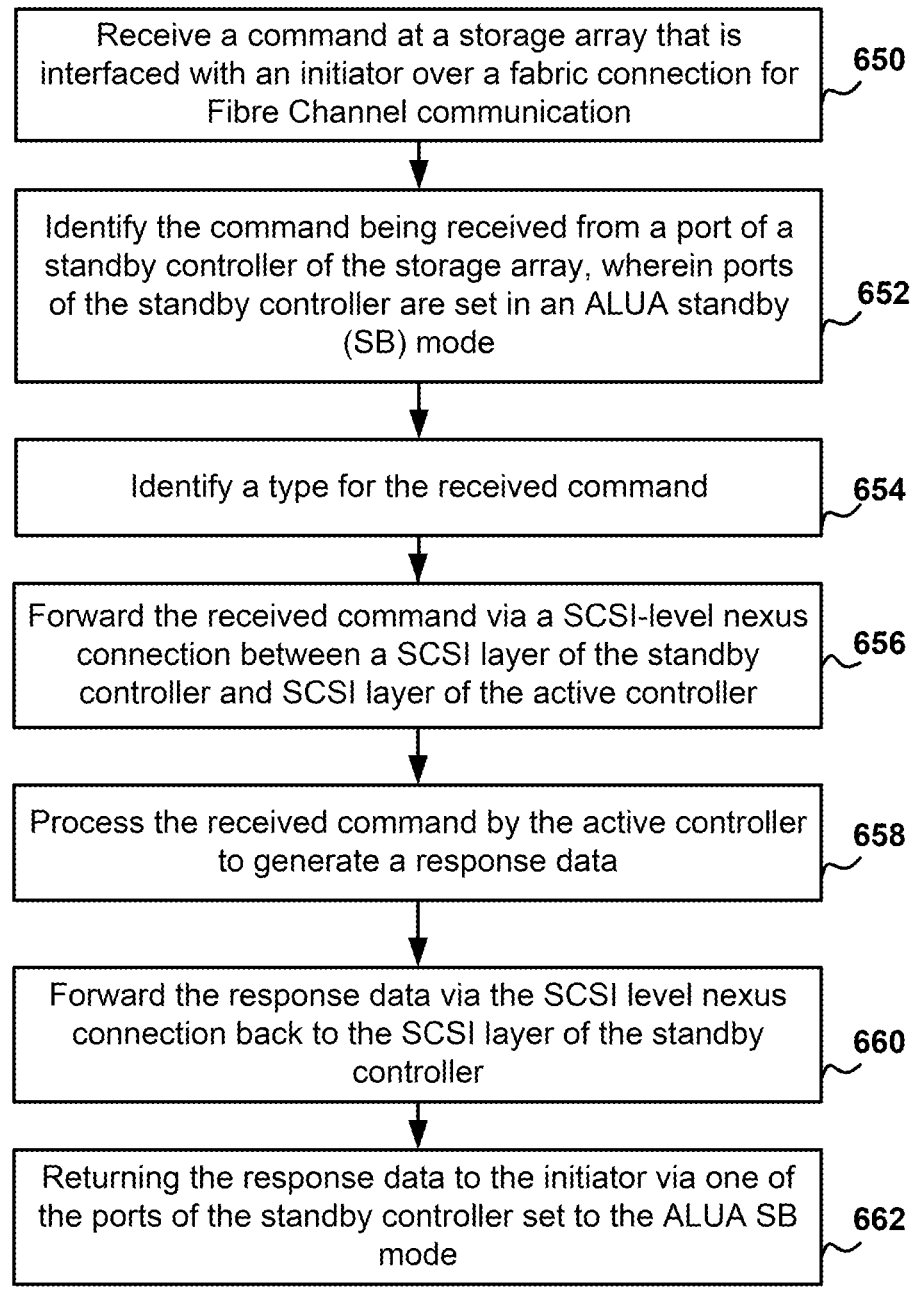
FIG. 7 illustrates one example method for processing the forwarding of commands over a SCSI nexus connection, in accordance with one embodiment.

FIG. 7 illustrates one example flow diagram of one method for processing ALUA forwarding at a SCSI-level, between a standby controller 224 and an active controller 220, in accordance with one embodiment. In operation 650, a command at a storage array 202 that is interfaced with an initiator 304 over a fabric connection 302 is received, for Fibre Channel communication. In operation 652, the command is received from a port of a standby controller 224 of the storage array 202. In general, the ports of the standby controller 224 are set in an ALUA standby (SB) mode. In operation 654, a type of the received command is identified. For example, if the command is one that requires a return error to the initiator, the error is returned.

In another example, if the command is one that can be processed by the standby controller 224, the SCSI layer 104 of the standby controller will process the command, e.g., via a user space process, and return data is sent back to the initiator. If the command is one that is identified for forwarding to the active controller 220, the method proceeds to operation 656. In operation 656, the received command via a SCSI-level nexus connection between a SCSI layer 104 of the standby controller 224 and SCSI layer 104 of the active controller 220 is forwarded. As noted above, the standby controller 224 will have a an SFW 902*b* module and the active controller 220 will have an SFW 902*b* module, by which the SCSI-level nexus connection can be handled. The respective SFW 902*b* will forward commands and the SFW 902*a* will return the processed commands.

In operation 568, the received command is processed by the active controller 220 to generate a response data, e.g., a processed command. In operation 660, the response data is sent back or forwarded via the SCSI-level nexus connection back to the SCSI layer 104 of the standby controller 224. In operation 662, the method proceeds to enable or process return of the response data to the initiator via one of the ports 604 of the standby controller 224, which are processing in the ALUA SB mode.

Figure 8:
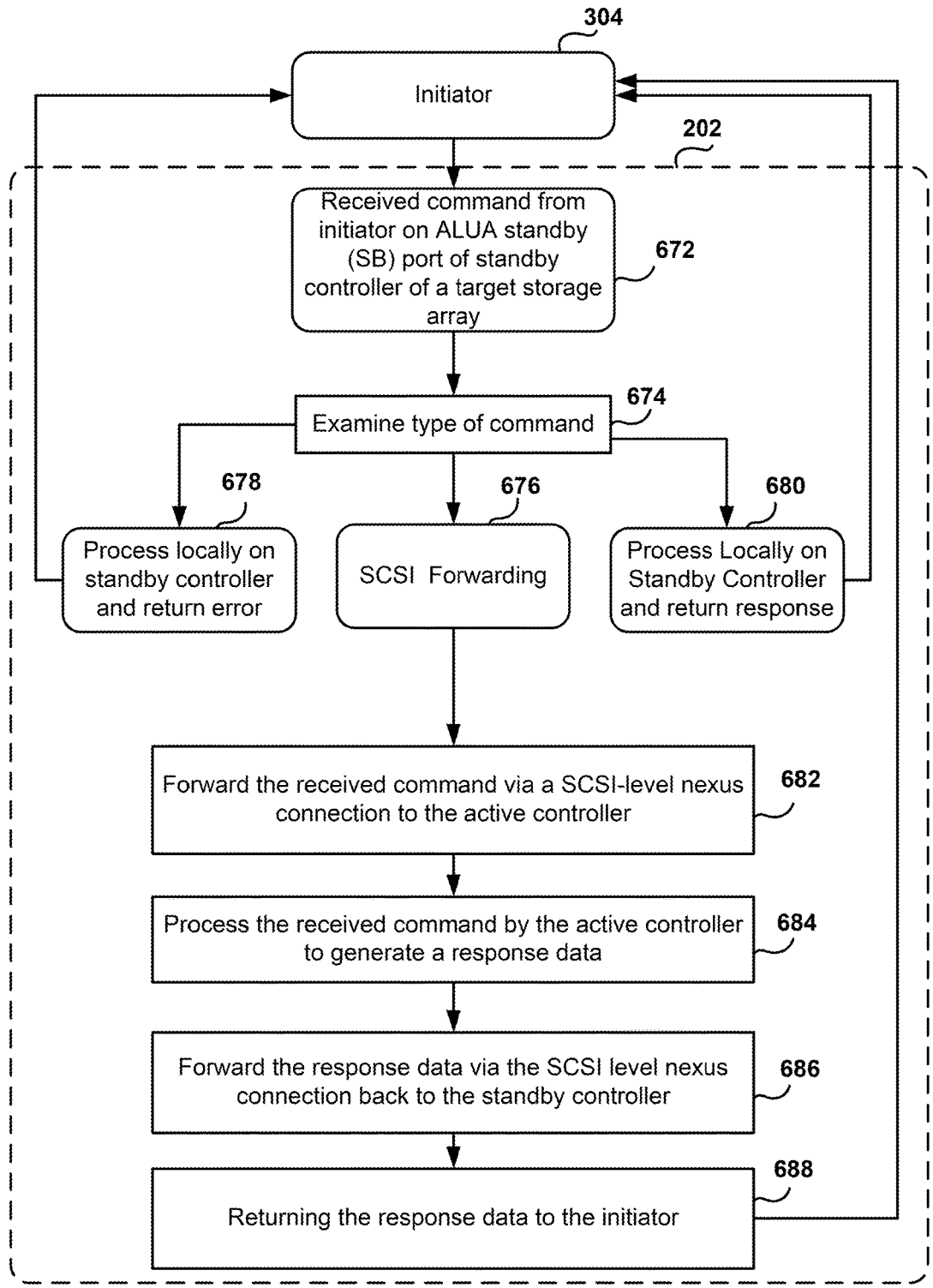
FIG. 8 illustrates operations that are processed by the storage array, in response to commands received from an initiator, in accordance with one embodiment.

FIG. 8 illustrates another flowchart diagram illustrating operations logically performed by a storage array 202, when interfacing with an initiator 304, in accordance with one embodiment. In this example, it is assumed that the storage array 202 includes a least an active controller 220, a standby controller 224, and the standby controller 224 has ports 604 that operate in an ALUA SB mode, while the active controller 220 has ports 602 that operate in the ALUA active optimized (AO) mode.

In one embodiment, the initiator 304 sends a command to the storage array 202 over a fabric 302. In operation 672, the command is received from the initiator 304 on one of the ports of the standby controller 224, which are set to operate in the ALUA SB mode. In operation 674, the command is examined to determine its type. Broadly speaking, commands can take on many forms, structures, sizes, frequencies, based on a chosen standard or design. In one configuration, the commands are SCSI commands.

The storage array 202 can be programmed, in one embodiment, to process certain commands in particular ways. For purposes of example, a first set of commands can be pre-identified or selected by the designer to be processed locally by the standby controller 224 and return an error, fault or message in operation 678. A second set of commands can be pre-identified or selected by the designer to be processed locally by the standby controller 224 provide a return response to the initiator 403, in operation 680. A third set of commands can be pre-identified or selected by the designer to be processed via ALUA forwarding in operation 676.

If the commands received via one of the ALUA SB ports of the standby controller 224 are identified as requiring forwarding, the method can proceed to operation 682. In operation 682, the received command is forwarded via a SCSI-level nexus connection to the active controller 220. By way of example, as shown in FIG. 6, the forwarding is facilitated by the SFW 902a of the active controller 220 and the SFW 902b of the standby controller 224. The processing, in one embodiment, may include operations [1]-[4], as described with reference to FIG. 6. In operation 684, the received command is processed by the SCSI layer 104 of the active controller 220 in order to generate response data.

In operation 686, the response data is forwarded via the SCSI-level nexus connection back to the standby controller 224, e.g., as shown in operation [3] of FIG. 6. In operation 688, the response data is returned to the initiator 304. Accordingly, the processing by the storage array 202 enables efficient forwarding of commands at the SCSI-level (e.g., between the SCSI layers 104 of the standby and active controllers), without having to re-traverse the stack when certain commands are sent to an ALUA SB port of a standby controller 224. Additionally, the forwarding is a SCSI-level transfer that does not require transfer between the active and standby controllers over the fabric 302.

Example Storage Array Infrastructure

In some embodiments, a plurality of storage arrays may be used in data center configurations or non-data center configurations. A data center may include a plurality of servers, a plurality of storage arrays, and combinations of servers and other storage. It should be understood that the exact configuration of the types of servers and storage arrays incorporated into specific implementations, enterprises, data centers, small office environments, business environments, and personal environments, will vary depending on the performance and storage needs of the configuration.

In some embodiments, servers may be virtualized utilizing virtualization techniques, such that operating systems can be mounted on hypervisors to allow hardware and other resources to be shared by specific applications. In virtualized environments, storage is also accessed by virtual hosts that provide services to the various applications and provide data and store data to storage. In such configurations, the storage arrays can be configured to service specific types of applications, and the storage functions can be optimized for the type of data being serviced.

For example, a variety of cloud-based applications are configured to service specific types of information. Some information requires that storage access times are sufficiently fast to service mission-critical processing, while other types of applications are designed for longer-term storage, archiving, and more infrequent accesses. As such, a storage array can be configured and programmed for optimization that allows servicing of various types of applications. In some embodiments, certain applications are assigned to respective volumes in a storage array. Each volume can then be optimized for the type of data that it will service.

As described above with reference to FIG. 2, the storage array 202 can include one or more controllers 220, 224. One controller serves as the active controller 220, while the other controller 224 functions as a backup controller (standby). For redundancy, if the active controller 220 were to fail, immediate transparent handoff of processing (i.e., fail-over) can be made to the standby controller 224. Each controller is therefore configured to access storage 1130, which in one embodiment includes hard disk drives (HDD) 226 and solid-state drives (SSD) 228. As mentioned above, SSDs 228 are utilized as a type of flash cache, which enables efficient reading of data stored to the storage 1130.

As used herein, SSDs functioning as "flash cache," should be understood to operate the SSD as a cache for block level data access, providing service to read operations instead of only reading from HDDs 226. Thus, if data is present in SSDs 228, reading will occur from the SSDs instead of requiring a read to the HDDs 226, which is a slower operation. As mentioned above, the storage operating system 106 is configured with an algorithm that allows for intelligent writing of certain data to the SSDs 228 (e.g., cache-worthy data), and all data is written directly to the HDDs 226 from NVRAM 218.

The algorithm, in one embodiment, is configured to select cache-worthy data for writing to the SSDs 228, in a manner that provides an increased likelihood that a read operation will access data from SSDs 228. In some embodiments, the algorithm is referred to as a cache accelerated sequential layout (CASL) architecture, which intelligently leverages unique properties of flash and disk to provide high performance and optimal use of capacity. In one embodiment, CASL caches "hot" active data onto SSD in real time—without the need to set complex policies. This way, the storage array can instantly respond to read requests—as much as ten times faster than traditional bolt-on or tiered approaches to flash caching.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In some implementations, SSDs 228 may be referred to as flash, or flash cache, or flash-based memory cache, or flash drives, storage flash, or simply cache. Consistent with the use of these terms, in the context of storage array 102, the various implementations of SSD 228 provide block level caching to storage, as opposed to instruction level caching. As mentioned above, one functionality enabled by algorithms of the storage OS 106 is to provide storage of cache-worthy block level data to the SSDs, so that subsequent read operations are optimized (i.e., reads that are likely to hit the flash cache will be stored to SSDs 228, as a form of storage caching, to accelerate the performance of the storage array 102).

In one embodiment, it should be understood that the "block level processing" of SSDs 228, serving as storage cache, is different than "instruction level processing," which is a common function in microprocessor environments. In one example, microprocessor environments utilize main memory, and various levels of cache memory (e.g., L1, L2, etc). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

In the various implementations described herein, the storage caching facilitated by SSDs 228 is implemented by algorithms exercised by the storage OS 106, which can differentiate between the types of blocks being processed for each type of application or applications. That is, block data being written to storage 1130 can be associated with block data specific applications. For instance, one application may be a mail system application, while another application may be a financial database application, and yet another may be for a website-hosting application. Each application can have different storage accessing patterns and/or requirements. In accordance with several embodiments described herein, block data (e.g., associated with the specific applications) can be treated differently when processed by the algorithms executed by the storage OS 106, for efficient use of flash cache 228.

Continuing with the example of FIG. 2, that active controller 220 is shown including various components that enable efficient processing of storage block reads and writes. As mentioned above, the controller may include an input output (I/O) 210, which can enable one or more machines to access functionality of the storage array 202. This access can provide direct access to the storage array, instead of accessing the storage array over a network. Direct access to the storage array is, in some embodiments, utilized to run diagnostics, implement settings, implement storage updates, change software configurations, and/or combinations thereof. As shown, the CPU 208 is communicating with storage OS 106.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

The method operations were described in a specific order, but it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

The invention claimed is:

1. A method for processing commands by a storage array having an active controller and a standby controller, the standby controller having ports that operate in an asymmetric logical unit access (ALUA) standby (SB) mode, the method comprising:
receiving a command by a port of the standby controller, the port operating in the ALUA SB mode, and the command received via a stack that includes a Fibre Channel driver and a Fibre Channel transport;
identifying that the command is of a type that is predefined for forwarding to the active controller;
processing the command received at the port that is operating in the ALUA SB mode in a user space of the standby controller before forwarding the command to the active controller;
forwarding the command from a SCSI layer of the standby controller to a SCSI layer of the active controller without transmitting the command through a Fibre Channel fabric;
processing the command in a user space of the active controller to generate return data;
forwarding the return data from the active controller to the standby controller; and
sending the return data to an initiator of the command over the port of the standby controller.

2. The method of claim 1, wherein a SCSI forwarding (SFW) module is executed in the user space of the active controller and a user space of the standby controller, wherein the SFW module, the SCSI layer of the active controller, and the SCSI layer of the standby controller that has ports that operate in the ALUA SB mode, operate to define a SCSI-level nexus connection for forwarding the command to the active controller and for forwarding the return data to the standby controller.

3. The method of claim 1, wherein the type of the command that is predefined for forwarding is one of a persistent reserve-in command, a persistent reserve-out command, and a log sense command.

4. The method of claim 1, wherein the type of command that is predefined for forwarding is not a read or a write command.

5. The method of claim 1, wherein types of commands that are not predefined for forwarding to the active controller are processed locally by the standby controller and a return is provided to the initiator.

6. The method of claim 1, wherein the forwarding of the command from the SCSI layer of the standby controller to the SCSI layer of the active controller is defined as a data transfer over a SCSI-level nexus connection.

7. The method of claim 1, wherein the forwarding of the return data is not transmitted over the Fibre Channel fabric.

8. A non-transitory computer readable storage medium storing instructions that are executable by a processor to cause the processor to:
receive a command by a port of a standby controller in a storage array that includes an active controller and the standby controller, wherein the port of the standby controller is set to operate in an asymmetric logical unit access (ALUA) standby (SB) mode, and the command is received via a stack that includes a Fibre Channel driver and a Fibre Channel transport;
identify that the command is of a type that is predefined for forwarding to the active controller;
process the command received at the port that is operating in the ALUA SB mode in a user space of the standby controller before forwarding the command to the active controller;
forward the command from a SCSI layer of the standby controller to a SCSI layer of the active controller without transmitting the command through a Fibre Channel fabric, wherein the command is processed in a user space of the active controller to generate return data;
receive the return data from the active controller; and send the return data to an initiator of the command over the port of the standby controller.

9. The non-transitory computer readable storage medium of claim 8, further storing SCSI forwarding (SFW) instructions that are executable in the user space of the active controller and a user space of the standby controller, wherein the SFW instructions, the SCSI layer of the active controller, and the SCSI layer of the standby controller that has ports that operate in the ALUA SB mode, operate to define a SCSI-level nexus connection for forwarding the command to the active controller and for receiving the return data to the standby controller.

10. The non-transitory computer readable storage medium of claim 8, wherein the type of the command that is predefined for forwarding is one of a persistent reserve-in command, a persistent reserve-out command, and a log sense command.

11. The non-transitory computer readable storage medium of claim 8, wherein the type of command that is predefined for forwarding is not a read or a write command.

12. The non-transitory computer readable storage medium of claim 8, further storing instructions executable to cause the processor to:
identify that the command is a type that is not predefined for forwarding to the active controller;
process the command locally at the standby controller; and
provide a return of the processed command to the initiator.

13. The non-transitory computer readable storage medium of claim 8, wherein the return data received from the active controller is not transmitted over the Fibre Channel fabric.

14. A storage array comprising:
an active controller; and
a standby controller, wherein the standby controller comprises a processor and a memory storing instructions that are executable to cause the processor to:
receive a command by a port of the standby controller, wherein the port is set to operate in an asymmetric logical unit access (ALUA) standby (SB) mode, and the command received via a stack that includes a Fibre Channel driver and a Fibre Channel transport;
identify that the command is of a type that is predefined for forwarding to the active controller;
process the command received at the port that is operating in the ALUA SB mode in a user space of the standby controller before forwarding the command to the active controller;
forward the command from a SCSI layer of the standby controller to a SCSI layer of the active controller without transmitting the command through a Fibre Channel fabric, wherein the command is processed in a user space of the active controller to generate return data;
receive the return data from the active controller; and
send the return data to an initiator of the command over the port of the standby controller.

15. The storage array of claim 14, wherein the memory of the standby controller further stores SCSI forwarding (SFW) instructions that are executable in the user space of the active controller and a user space of the standby controller, wherein the SFW instructions, the SCSI layer of the active controller, and the SCSI layer of the standby controller operate to define a SCSI-level nexus connection for forwarding the command to the active controller and for receiving the return data to the standby controller.

16. The storage array of claim 14, wherein the type of the command that is predefined for forwarding is one of a persistent reserve-in command, a persistent reserve-out command, and a log sense command.

17. The storage array of claim 14, wherein the type of command that is predefined for forwarding is not a read or a write command.

18. The storage array of claim 14, wherein the memory of the standby controller further stores instructions that are executable to cause the processor to:
identify that the command is a type that is not predefined for forwarding to the active controller;
process the command locally at the standby controller; and
provide a return of the processed command to the initiator.

19. The storage array of claim 14, wherein the return data received from the active controller is not transmitted over a Fiber Channel fabric.

* * * * *